Patented Nov. 11, 1952

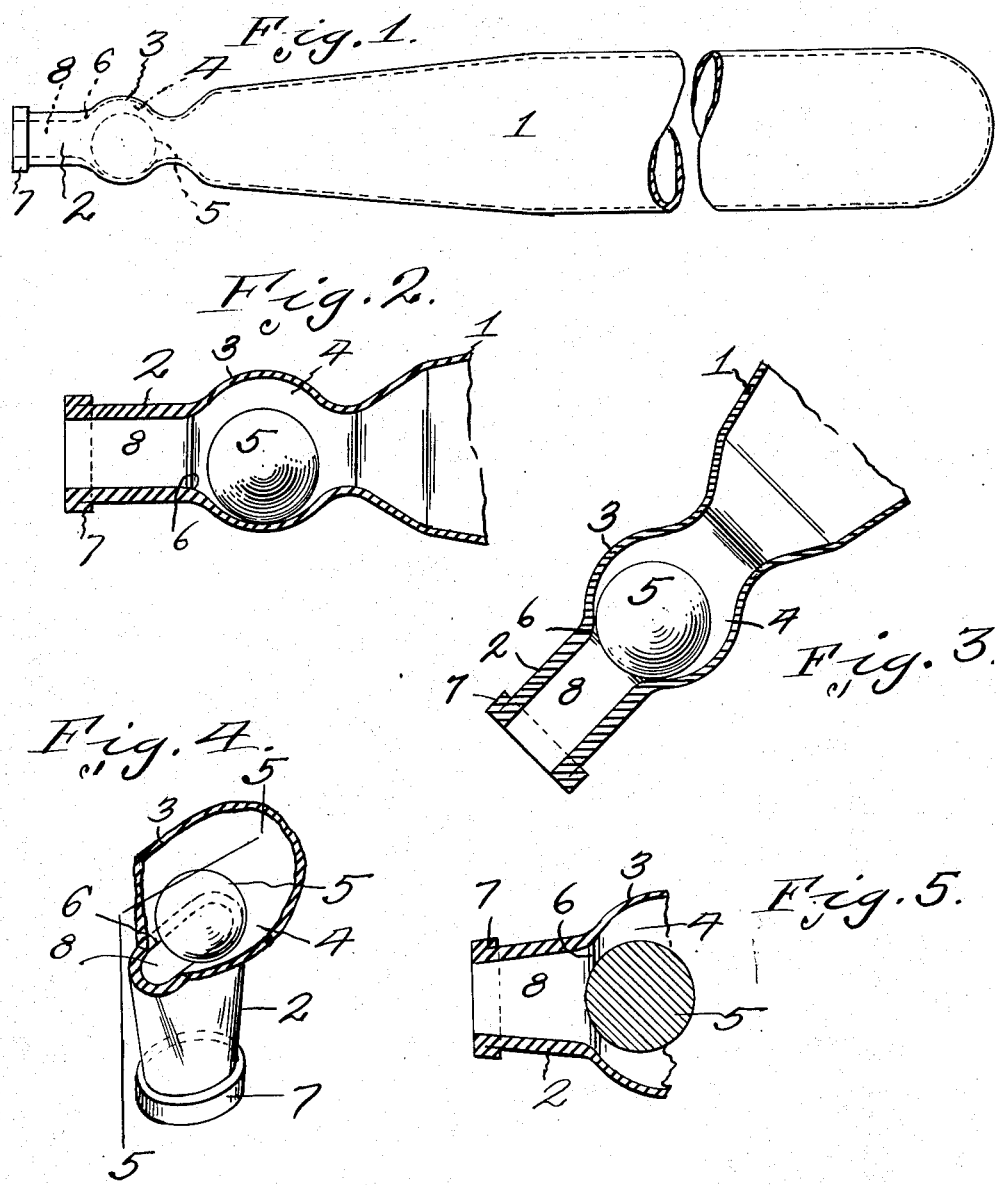

2,617,624

UNITED STATES PATENT OFFICE 2,617,624

BALLOON INFLATING VALVE

Andrew Jackson Annis, Baltimore, Md.

Application February 5, 1947, Serial No. 726,451

1 Claim. (Cl. 251—121)

The invention relates to balloon inflating valves of the toy balloon type, and has for its object to provide the stem with a bulbular chambered portion, in which a smaller spherical ball is disposed, which ball will allow the passage of air to the chamber of the balloon, during an inflating operation, and when the balloon is slightly inclined, the ball will seat and be held seated against a seat in the stem, thereby preventing deflation of the balloon.

A further object is to form the mouth piece of the stem from slightly heavier material so that when the stem is compressed between the fingers, the valve seat will be deformed, thereby allowing the air to exhaust around the ball valve to the atmosphere.

A further object is to form the ball from a solid member having a smooth surface so it will easily slip into the bulbular chamber when the stem is collapsed for the deflating operation.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 1 is a side elevation of the balloon, showing the ball valve in unseated position for an inflating operation.

Figure 2 is an enlarged longitudinal sectional view through the balloon stem, showing the ball in unseated position.

Figure 3 is a view similar to Figure 2, but showing the ball in closed position after an inflating operation.

Figure 4 is a detail perspective view showing the stem compressed and the ball valve unseated, and the valve seat distorted for the deflating operation.

Figure 5 is a transverse sectional view through the stem and valve after the stem has been compressed, and the ball unseated.

Referring to the drawings, the numeral 1 designates the body of the balloon, which body is provided with an elongated inflating stem 2 having, spaced from its ends, an enlarged bulbular portion 3 forming a substantially cylindrical chamber 4, in which is disposed a spherical valve 5 of smaller diameter than the chamber 4, and adapted, incident to its size, to allow air to pass to the body 1 for an inflating operation, and for preventing deflation the stem is preferably slightly tilted, as shown in Figure 3, so that the ball 5 will be held seated by the pressure within the balloon body 1. It will be noted that the outer portion of the stem 2 has its wall thicker than the bulbular portion 3, thereby forming a relatively stiff surface 6, which will not easily deform. The outer end of the stem 2, during the formation of the same, is folded or rolled onto itself as shown at 7, to form a mouth piece.

When it is desired to deflate the balloon, the operator grasps opposite sides of the thickened portion of the stem 2 and squeezes the same inwardly as shown in Figure 4. This operation will transversely elongate the passage 8 through the stem, thereby allowing air to bypass the ball valve 5 at opposite sides thereof, and by having a stiffened valve seat 6, the valve will easily slide away from the seat into the bulbular chamber 4, as shown in Figure 5. The ball valve may be formed from a glazed ceramic material, for instance a marble, or a large steel ball bearing which has a polished surface. In either case, the polished surface will slide over the rubber or gum without the same clinging thereto.

The invention having been set forth what is claimed as new and useful is:

A check valve adapted for use in connection with an inflating mouth piece of a toy balloon, said mouth piece being formed from rubber and having an outer cylindrical end provided with an air passage therethrough, the wall of said cylindrical end being relatively thick in relation to the inner portion of the mouth piece, the inner end of the outer portion of the mouth piece merging into a bulbular inner portion of the mouth piece, the bulbular portion having a spherical ball receiving chamber therein, the outer end of the bulbular portion having its wall increasing in thickness where it merges into the inner end of the cylindrical outer portion of the mouth piece, thereby forming a relatively stiff check valve seat in relation to the bulbular portion, a ball check valve in the chamber of the bulbular portion and smaller than the spherical chamber, said ball check valve having its entire surface smooth, whereby the ball check valve will easily slip from the seat and over the inner surface of the spherical chamber and into the spherical chamber when the cylindrical portion of the mouth piece is compressed from opposite sides and transversely elongated at the seat.

ANDREW JACKSON ANNIS.

REFERENCES CITED

The following references are of record in the file of this patent:

UNITED STATES PATENTS

| Number | Name | Date |
|---|---|---|
| 605,693 | Black | June 4, 1898 |
| 1,111,642 | Brucker | Sept. 22, 1914 |
| 1,136,932 | Brucker | Apr. 27, 1915 |
| 1,137,969 | Hays | May 4, 1915 |
| 1,447,848 | Holycross | Mar. 6, 1923 |
| 1,551,986 | Ferretti | Sept. 1, 1925 |
| 1,629,838 | Perdue | May 24, 1927 |
| 1,659,399 | Faber | Feb. 14, 1928 |
| 1,905,361 | Bacon | Apr. 25, 1933 |
| 2,197,617 | Magran | Apr. 16, 1940 |
| 2,219,604 | Trotter | Oct. 29, 1940 |
| 2,314,767 | Burrell | Mar. 23, 1943 |